United States Patent
Re et al.

(10) Patent No.: US 10,779,614 B2
(45) Date of Patent: Sep. 22, 2020

(54) CUSHIONING FOR A SOLE STRUCTURE OF PERFORMANCE FOOTWEAR

(71) Applicant: Under Armour, Inc., Baltimore, MD (US)

(72) Inventors: Matthew Re, Baltimore, MD (US); Alan Guyan, Baltimore, MD (US)

(73) Assignee: UNDER ARMOUR, INC., Baltimore, MD (US)

( * ) Notice: Subject to any disclaimer, the term of this patent is extended or adjusted under 35 U.S.C. 154(b) by 47 days.

(21) Appl. No.: 16/012,107

(22) Filed: Jun. 19, 2018

(65) Prior Publication Data
US 2018/0368518 A1    Dec. 27, 2018

Related U.S. Application Data

(60) Provisional application No. 62/522,767, filed on Jun. 21, 2017.

(51) Int. Cl.
| | |
|---|---|
| *A43B 13/18* | (2006.01) |
| *A43B 13/12* | (2006.01) |
| *A43B 5/06* | (2006.01) |
| *B33Y 80/00* | (2015.01) |

(52) U.S. Cl.
CPC ............ *A43B 13/181* (2013.01); *A43B 13/12* (2013.01); *A43B 13/184* (2013.01); *A43B 5/06* (2013.01); *B33Y 80/00* (2014.12)

(58) Field of Classification Search
CPC ....... A43B 13/04; A43B 13/181; A43B 13/12; A43B 13/184; A43B 5/06
See application file for complete search history.

(56) References Cited

U.S. PATENT DOCUMENTS

| | | |
|---|---|---|
| 1,800,406 A | 4/1931 | De Blois |
| 3,469,576 A | 9/1969 | Everts |
| 4,168,341 A | 9/1979 | Siedenstrang et al. |
| 4,170,078 A | 10/1979 | Moss |
| 4,245,406 A | 1/1981 | Landay |
| 4,297,796 A | 11/1981 | Stirtz et al. |
| 4,316,335 A | 2/1982 | Giese |

(Continued)

FOREIGN PATENT DOCUMENTS

| | | |
|---|---|---|
| AU | 2008207351 | 3/2009 |
| CN | 1190560 | 8/1998 |

(Continued)

*Primary Examiner* — Ted Kavanaugh
(74) *Attorney, Agent, or Firm* — Edell, Shapiro & Finnan, LLC

(57) ABSTRACT

The present invention is directed toward cushioning for a sole structure for an article of footwear. The cushioning is three-dimensionally (3D) printed cushioning formed from a plurality of cells. Each cell in the plurality of cells includes a lattice of elongate structures that extend symmetrically around an offset axis. The elongate structures of adjacent cells in the plurality of cells connect so that the plurality of cells form a unitary structure and, as the elongate structures of each cell are compressed by a compressive force, the elongate structures of each cell create a lateral shear. As the compressive force is released, the elongate structures return to a rest position, exerting a restorative force on the insole and/or upper of an article of footwear in which the cushioning is included.

14 Claims, 8 Drawing Sheets

(56) References Cited

U.S. PATENT DOCUMENTS

| | | |
|---|---|---|
| 4,535,553 A | 8/1985 | Derderian et al. |
| 4,546,556 A | 10/1985 | Stubblefield |
| 4,594,799 A | 6/1986 | Lin |
| 4,598,487 A | 7/1986 | Misevich |
| 4,663,865 A | 5/1987 | Telecemian |
| 4,769,927 A | 9/1988 | Liggett et al. |
| 4,845,863 A | 7/1989 | Yung-Mao |
| 4,854,055 A | 8/1989 | Sugiyama |
| 4,863,538 A | 9/1989 | Deckard |
| 4,864,738 A | 9/1989 | Horovitz |
| 4,938,816 A | 7/1990 | Beaman et al. |
| 5,005,575 A | 4/1991 | Geri |
| 5,022,168 A | 6/1991 | Jeppson, II et al. |
| 5,117,566 A | 6/1992 | Lloyd |
| 5,156,697 A | 10/1992 | Bourell et al. |
| 5,218,773 A | 6/1993 | Beekman |
| 5,231,776 A | 8/1993 | Wagner |
| 5,255,451 A | 10/1993 | Tong et al. |
| 5,261,169 A | 11/1993 | Williford |
| 5,337,492 A | 8/1994 | Anderie et al. |
| 5,348,693 A | 9/1994 | Taylor et al. |
| 5,353,526 A | 10/1994 | Foley |
| 5,367,791 A | 11/1994 | Gross et al. |
| 5,408,761 A | 4/1995 | Gazzano |
| 5,461,800 A | 10/1995 | Luthi et al. |
| 5,465,509 A | 11/1995 | Fuerst et al. |
| 5,511,323 A | 4/1996 | Dahlgren |
| 5,619,809 A | 4/1997 | Sessa |
| 5,661,864 A | 9/1997 | Valiant et al. |
| 5,678,329 A | 10/1997 | Griffin et al. |
| 5,682,685 A | 11/1997 | Terlizzi |
| 5,686,781 A | 11/1997 | Bury |
| 5,771,610 A | 6/1998 | McDonald |
| 5,876,767 A | 3/1999 | Mattes et al. |
| 5,896,680 A | 4/1999 | Kim et al. |
| 5,908,569 A | 6/1999 | Wilkening et al. |
| 5,983,524 A | 11/1999 | Polegato |
| 6,006,412 A | 12/1999 | Bergmann et al. |
| 6,029,376 A | 2/2000 | Cass |
| 6,108,943 A | 8/2000 | Hudson et al. |
| 6,110,411 A | 8/2000 | Clausen et al. |
| 6,193,923 B1 | 2/2001 | Leyden et al. |
| 6,205,682 B1 | 3/2001 | Park |
| 6,259,962 B1 | 7/2001 | Gothait |
| 6,360,454 B1 | 3/2002 | Dachgruber et al. |
| 6,367,172 B2 | 4/2002 | Hernandez |
| 6,412,196 B1 | 7/2002 | Gross |
| 6,533,885 B2 | 3/2003 | Davis et al. |
| 6,540,864 B1 | 4/2003 | Chi |
| 6,601,042 B1 | 7/2003 | Lyden |
| 6,601,321 B1 | 8/2003 | Kendall |
| 6,660,209 B2 | 12/2003 | Leyden et al. |
| 6,694,207 B2 | 2/2004 | Darrah et al. |
| 6,763,611 B1 | 7/2004 | Fusco |
| 6,769,202 B1 | 8/2004 | Luthi et al. |
| 6,817,112 B2 | 11/2004 | Berger et al. |
| 6,819,966 B1 | 11/2004 | Haeberli |
| 7,065,820 B2 | 6/2006 | Meschter |
| 7,077,638 B2 | 7/2006 | Leyden et al. |
| RE39,354 E | 10/2006 | Dickens, Jr. et al. |
| 7,148,286 B2 | 12/2006 | Baumann et al. |
| 7,207,125 B2 | 4/2007 | Jeppesen et al. |
| 7,291,002 B2 | 11/2007 | Russell et al. |
| 7,350,320 B2 | 4/2008 | Chandler |
| 7,424,783 B2 | 9/2008 | Meschter et al. |
| 7,484,318 B2 | 2/2009 | Finkelstein |
| 7,571,556 B2 | 8/2009 | Hardy et al. |
| 7,788,827 B2 | 9/2010 | Fogg et al. |
| 7,805,859 B2 | 10/2010 | Finkelstein |
| 8,522,454 B2 | 9/2013 | Schindler et al. |
| 9,320,316 B2 | 4/2016 | Guyan |
| 9,572,402 B2 | 2/2017 | Jarvis |
| 9,788,600 B2 | 10/2017 | Wawrousek |
| 10,575,588 B2* | 3/2020 | Perrault ............... B33Y 80/00 |
| 2001/0001904 A1 | 5/2001 | Hernandez |
| 2002/0023306 A1 | 2/2002 | Sajedi et al. |
| 2003/0051372 A1 | 3/2003 | Lyden |
| 2003/0069807 A1 | 4/2003 | Lyden |
| 2004/0104499 A1 | 6/2004 | Keller |
| 2004/0111920 A1 | 6/2004 | Cretinon |
| 2004/0118018 A1 | 6/2004 | Dua |
| 2004/0134099 A1 | 7/2004 | Jones et al. |
| 2004/0135292 A1 | 7/2004 | Coats et al. |
| 2004/0159014 A1 | 8/2004 | Sommer |
| 2004/0168329 A1 | 9/2004 | Ishimaru |
| 2004/0261295 A1 | 12/2004 | Meschter |
| 2005/0076536 A1 | 4/2005 | Hatfield et al. |
| 2005/0188564 A1 | 9/2005 | Delgorgue et al. |
| 2005/0282454 A1 | 12/2005 | Meschter et al. |
| 2006/0061012 A1 | 3/2006 | Hatfield et al. |
| 2006/0061613 A1 | 3/2006 | Fienup et al. |
| 2006/0064905 A1 | 3/2006 | Hudson et al. |
| 2006/0065499 A1 | 3/2006 | Smaldone et al. |
| 2006/0070260 A1 | 4/2006 | Cavanaugh et al. |
| 2006/0143839 A1 | 7/2006 | Fromme |
| 2006/0201028 A1 | 9/2006 | Chan et al. |
| 2006/0254087 A1 | 11/2006 | Fechter |
| 2007/0022631 A1 | 2/2007 | Ho |
| 2007/0163147 A1 | 7/2007 | Cavanagh et al. |
| 2007/0227041 A1 | 10/2007 | Menghini |
| 2007/0232753 A1 | 10/2007 | Monsheimer et al. |
| 2007/0240333 A1 | 10/2007 | Le et al. |
| 2008/0060221 A1 | 3/2008 | Hollinger |
| 2008/0115389 A1 | 5/2008 | Hsieh |
| 2008/0215176 A1 | 9/2008 | Borovinskih et al. |
| 2008/0289218 A1 | 11/2008 | Nakano |
| 2009/0012622 A1 | 1/2009 | James |
| 2009/0014424 A1 | 1/2009 | Meschter |
| 2009/0126225 A1 | 5/2009 | Jarvis |
| 2009/0145005 A1 | 6/2009 | Murphy et al. |
| 2009/0211119 A1 | 8/2009 | Moretti |
| 2009/0316965 A1 | 12/2009 | Milling et al. |
| 2010/0050480 A1 | 3/2010 | Moretti |
| 2010/0229430 A1 | 9/2010 | Berger et al. |
| 2011/0265352 A1 | 11/2011 | Lin |
| 2011/0277349 A1 | 11/2011 | Kim |
| 2012/0011782 A1 | 1/2012 | Kolas |
| 2012/0055043 A1 | 3/2012 | Schindler et al. |
| 2012/0117825 A9 | 5/2012 | Jarvis |
| 2014/0002019 A1 | 1/2014 | Park |
| 2014/0002677 A1 | 1/2014 | Schinker |
| 2014/0002903 A1 | 1/2014 | Shim |
| 2014/0020191 A1 | 1/2014 | Jones et al. |
| 2014/0025978 A1 | 1/2014 | Tokunaga |
| 2014/0026773 A1 | 1/2014 | Miller |
| 2014/0029030 A1 | 1/2014 | Miller |
| 2014/0029900 A1 | 1/2014 | Logan |
| 2014/0030067 A1 | 1/2014 | Kim |
| 2014/0109440 A1 | 4/2014 | McDowell |
| 2014/0109441 A1 | 4/2014 | McDowell et al. |
| 2014/0115920 A1 | 5/2014 | McCue |
| 2014/0182170 A1 | 7/2014 | Wawrousek |
| 2014/0226773 A1 | 8/2014 | Toth et al. |
| 2014/0259787 A1* | 9/2014 | Guyan ............... A43B 13/14 36/103 |
| 2014/0299009 A1 | 10/2014 | Miller et al. |
| 2014/0300675 A1 | 10/2014 | Miller et al. |
| 2014/0300676 A1 | 10/2014 | Miller et al. |
| 2015/0033581 A1 | 2/2015 | Barnes et al. |
| 2015/0128448 A1 | 5/2015 | Lodger |
| 2015/0193559 A1 | 7/2015 | Musuvathy |
| 2016/0051009 A1* | 2/2016 | Kormann ............ B22F 3/1055 36/103 |
| 2016/0095385 A1 | 4/2016 | Nordstrom |
| 2016/0122493 A1* | 5/2016 | Farris ................ B29D 35/00 521/82 |
| 2016/0242502 A1 | 8/2016 | Spanks |
| 2016/0325520 A1* | 11/2016 | Berger ................ B32B 3/12 |
| 2016/0374428 A1* | 12/2016 | Kormann ............ A43B 13/186 36/28 |
| 2017/0224053 A1 | 8/2017 | Truelsen |
| 2017/0231322 A1 | 8/2017 | Gheorghian |
| 2017/0332733 A1 | 11/2017 | Cluckers |

(56) References Cited

U.S. PATENT DOCUMENTS

FOREIGN PATENT DOCUMENTS

| | | |
|---|---|---|
| CN | 2357543 | 1/2000 |
| CN | 1252344 | 5/2000 |
| CN | 2676682 | 2/2005 |
| DE | 202004018209 | 1/2005 |
| DE | 102005023473 | 11/2006 |
| EP | 0526892 A2 | 10/1993 |
| EP | 2564719 A1 | 3/2013 |
| EP | 2424398 B1 | 12/2015 |
| ES | 2442448 A1 | 2/2014 |
| JP | 08197652 | 8/1996 |
| JP | 09057874 | 3/1997 |
| JP | 09277384 A | 10/1997 |
| JP | 10240964 A | 9/1998 |
| JP | 2002001827 A | 1/2002 |
| JP | 2004042545 A | 2/2004 |
| JP | 2009045244 A | 3/2009 |
| WO | 0053398 | 9/2000 |
| WO | 2001024575 | 4/2001 |
| WO | 2004018966 | 3/2004 |
| WO | 2004073416 | 9/2004 |
| WO | 2004092346 | 10/2004 |
| WO | 2006034261 A2 | 3/2006 |
| WO | 2006047259 | 5/2006 |
| WO | 2006098715 A1 | 9/2006 |
| WO | 2008010855 | 1/2008 |
| WO | 2009035831 | 3/2009 |
| WO | 2009114715 A1 | 3/2009 |
| WO | 2009086520 A1 | 7/2009 |
| WO | 2009055451 A1 | 6/2010 |
| WO | 2010126708 A2 | 3/2011 |
| WO | 2014009587 A1 | 1/2014 |
| WO | 2014008331 A2 | 2/2014 |
| WO | 2014015037 A2 | 4/2014 |
| WO | 2014100462 A1 | 10/2014 |

\* cited by examiner

FRONT PERSPECTIVE

SIDE PERSPECTIVE

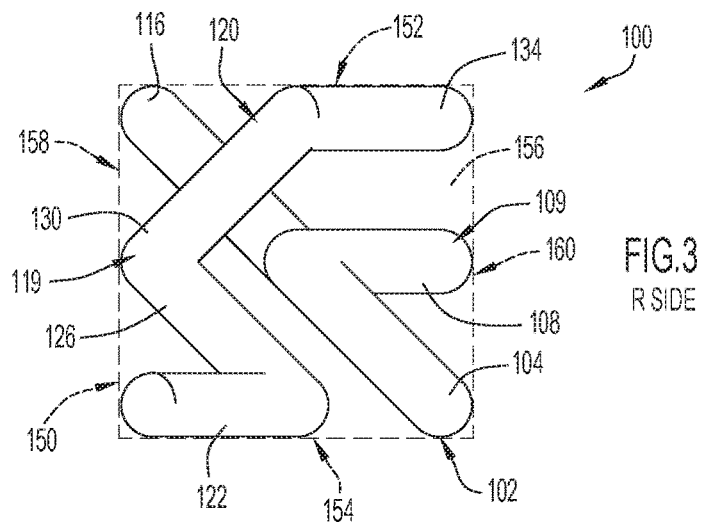
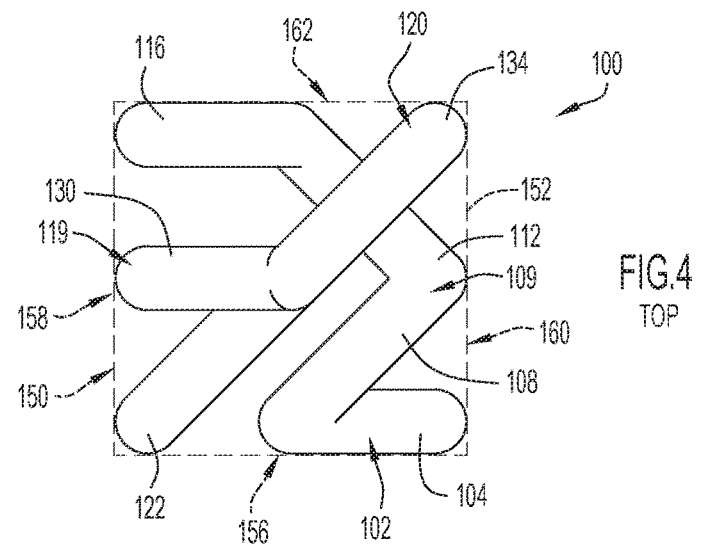
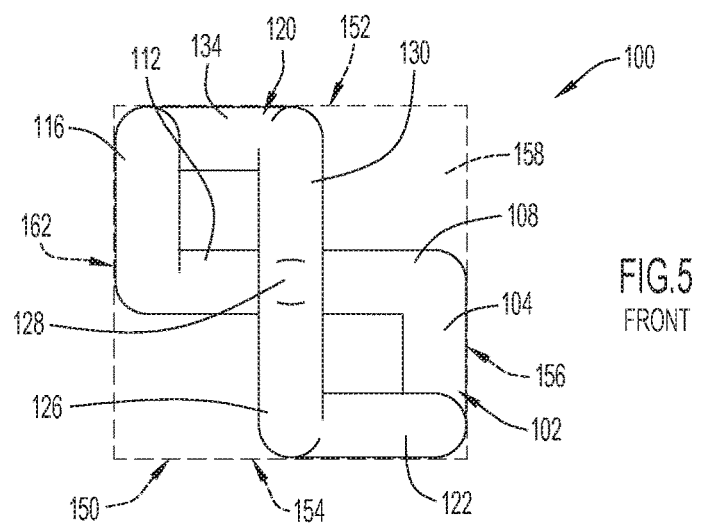

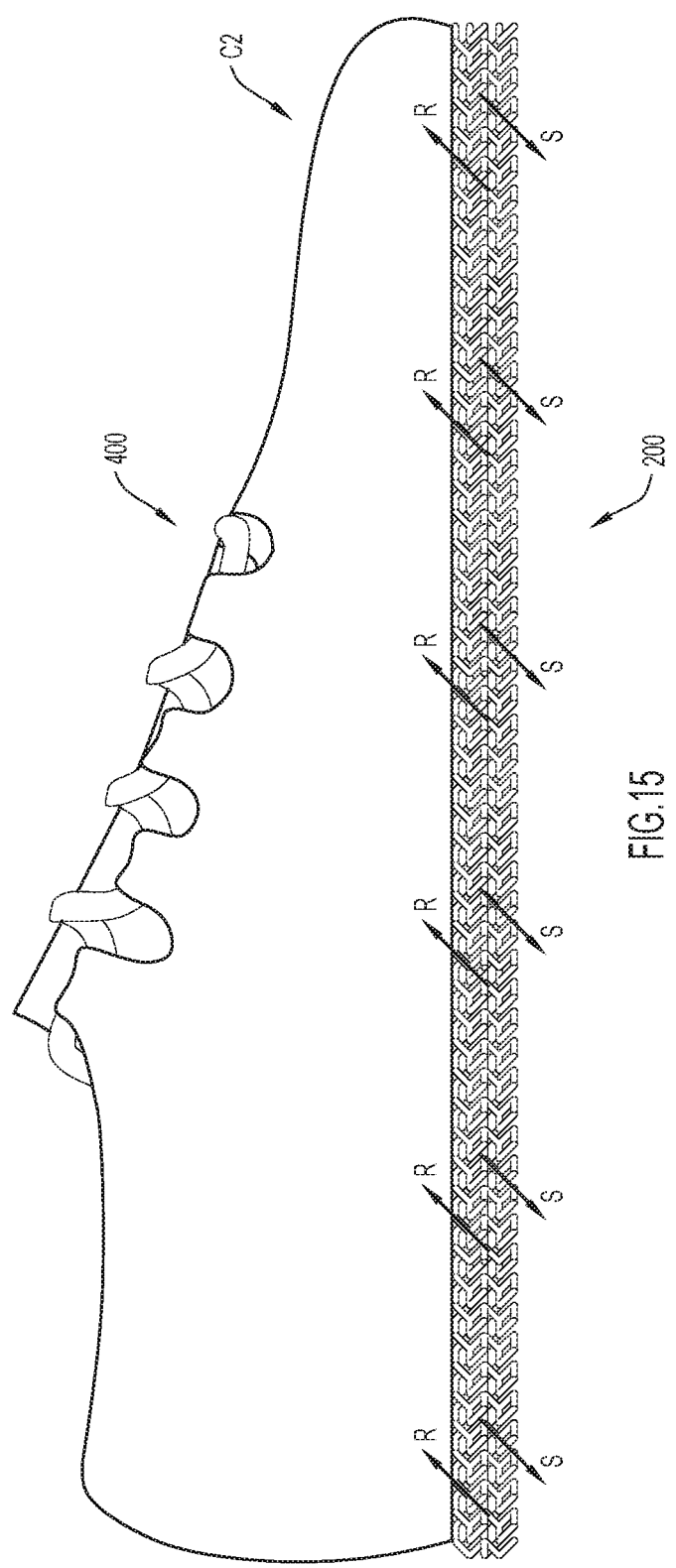

CUSHIONING FOR A SOLE STRUCTURE OF PERFORMANCE FOOTWEAR

CROSS-REFERENCE TO RELATED APPLICATIONS

This application claims priority under 35 U.S.C. § 119(e) to U.S. Provisional Patent Application Ser. No. 62/522,767, entitled "Cushioning For A Sole Structure Of Performance Footwear," filed Jun. 21, 2017, the disclosure of which is incorporated herein by reference in its entirety for all purposes.

FIELD OF THE INVENTION

The present invention is directed toward performance footwear and, in particular, toward cushioning for a sole structure of an article of performance footwear, such as a running shoe or basketball shoe.

BACKGROUND OF THE INVENTION

Performance footwear is typically constructed from an upper and a sole structure. The upper typically conforms to and secures a wearer's foot within a shoe while the sole structure is typically a durable, wear-resistant component that provides cushioning as the article footwear impacts the ground. In some instances, the sole structure includes an insole, a midsole, and an outsole, but in other instances the sole structure may be a unitary and/or one-piece structure.

A particular sole structure configuration may be selected for an article of footwear by balancing a need for comfort against any negative impact the features providing comfort may have on performance of the wearer in view of the intended use of the shoe. For example, a shoe intended for track running may include a light sole structure with minimal cushioning to minimize the weight on the foot of the runner. Meanwhile, a shoe intended for basketball may also attempt to minimize weight, but additional weight may be tolerated to ensure that the sole structure is durable and comfortable enough to protect the wearer's foot during the high intensity movements associated with basketball. However, notably, the sole structure itself does not typically enhance performance of the wearer. Instead, to the contrary, a sole structure is typically designed to minimize any negative impact on the performance of a wearer. Thus, it would be desirable to provide a sole structure for performance footwear that is lightweight and durable, but also enhances performance of the wearer.

BRIEF SUMMARY OF THE INVENTION

The present invention is directed toward cushioning for a sole structure of an article of performance footwear, such as a running shoe or basketball shoe, and a method of manufacturing the same. The invention can be embodied as an outsole for an article of footwear formed from the cushioning, a method of forming the cushioning, and an article of footwear including a sole structure with the cushioning.

According to at least one embodiment, the cushioning is three-dimensionally (3D) printed cushioning formed from a plurality of cells. Each cell in the plurality of cells includes a lattice of elongate structures that extend symmetrically around an offset axis. The elongate structures of adjacent cells in the plurality of cells connect so that the plurality of cells form a unitary structure and, as the elongate structures of each cell are compressed by a compressive force, the elongate structures of each cell create a lateral shear. As the compressive force is released, the elongate structures return to a rest position, exerting a restorative force on the insole and/or upper of an article of footwear in which the cushioning is included.

BRIEF DESCRIPTION OF THE SEVERAL VIEWS OF THE DRAWINGS

FIG. 3 is a side view of the cell of FIG. 1.

FIG. 4 is a top view of the cell of FIG. 1.

FIG. 5 is a front view of the cell of FIG. 1.

FIG. 15 is a side view of a running shoe including a layer of the directional cushioning of FIG. 6 as a sole structure.

Like numerals identify like components throughout the figures.

DETAILED DESCRIPTION OF THE INVENTION

Figure 1:
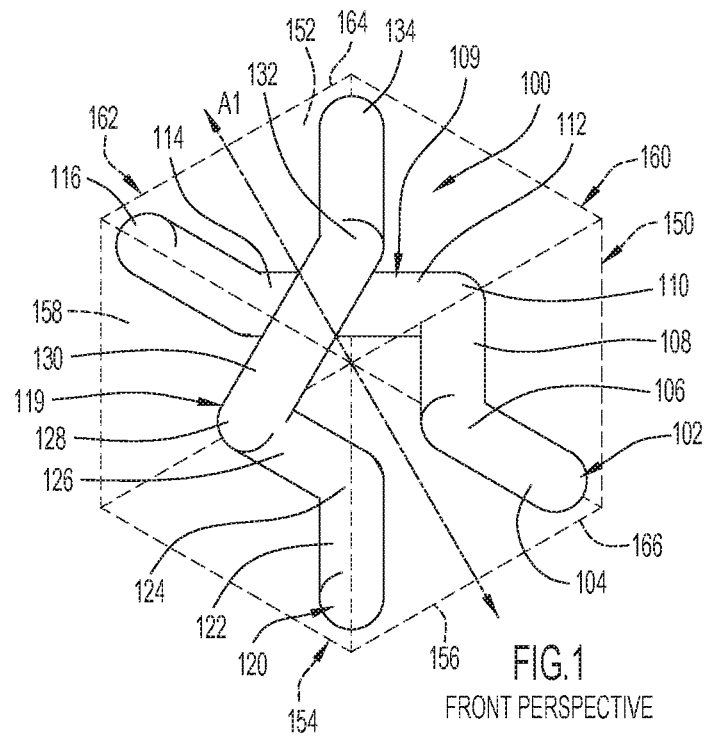
FIG. 1 is a front perspective view of a cell including a lattice of elongate structures, a plurality of which can be used to form an outsole for an article of footwear.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Now referring generally to the Figures, a sole structure or at least cushioning for a sole structure is presented herein. The cushioning is referred to herein as directional cushioning because the cushioning shears (i.e., moves laterally, insofar as lateral refers to generally horizontal directions and not necessarily directions that are perpendicular to a medial or lateral side of a shoe) as it is compressed. Consequently, and advantageously, the directional cushioning presented herein provides a lateral return force as compressive forces acting on the directional cushioning are relaxed. For example, if the directional cushioning is configured in a first orientation, the cushioning may create a return or restorative force directed towards a front or forward portion of the shoe as a wearer lifts his or her foot off of the ground. This return force may spring or propel the wearer's foot forward as the wearer lifts his or her foot of the ground during a running motion. Alternatively, if the directional cushioning is configured in a second orientation, the cushioning may create a return force directed towards a medial side of shoe as a wearer lifts his or her foot off of the ground. This return force may spring the wearer's foot inwards after the wearer applies a force towards the lateral side of shoe, for example, when cutting or changing directions. Each of these orientations is described in further detail below in connection with FIGS. 14 and 15.

Still referring generally to the Figures, the directional cushioning presented herein is formed with three-dimensional (3D) printing techniques that are now known or hereinafter developed. These techniques precisely form offset lattice structures that form the directional cushioning, ensuring that the directional cushioning provides sufficient cushioning and a desired amount of shear. The 3D printed directional cushioning can be incorporated into an outsole for an article of footwear or used in lieu of an outsole. For example, the directional cushioning can be formed to match the shape of an upper, attached to the upper, and serve as the outsole for a shoe. In some embodiments, the upper may include or subsequently receive an insole. Generally, the cushioning presented herein has enough rigidity and durability to comfortably support a wearer's foot over the life of a shoe. That is, the directional cushioning has a durability that is similar to conventional sole structures or cushioning included therein. In fact, in at least some embodiments, the directional cushioning may be more durable than conventional outsoles.

Figure 6:
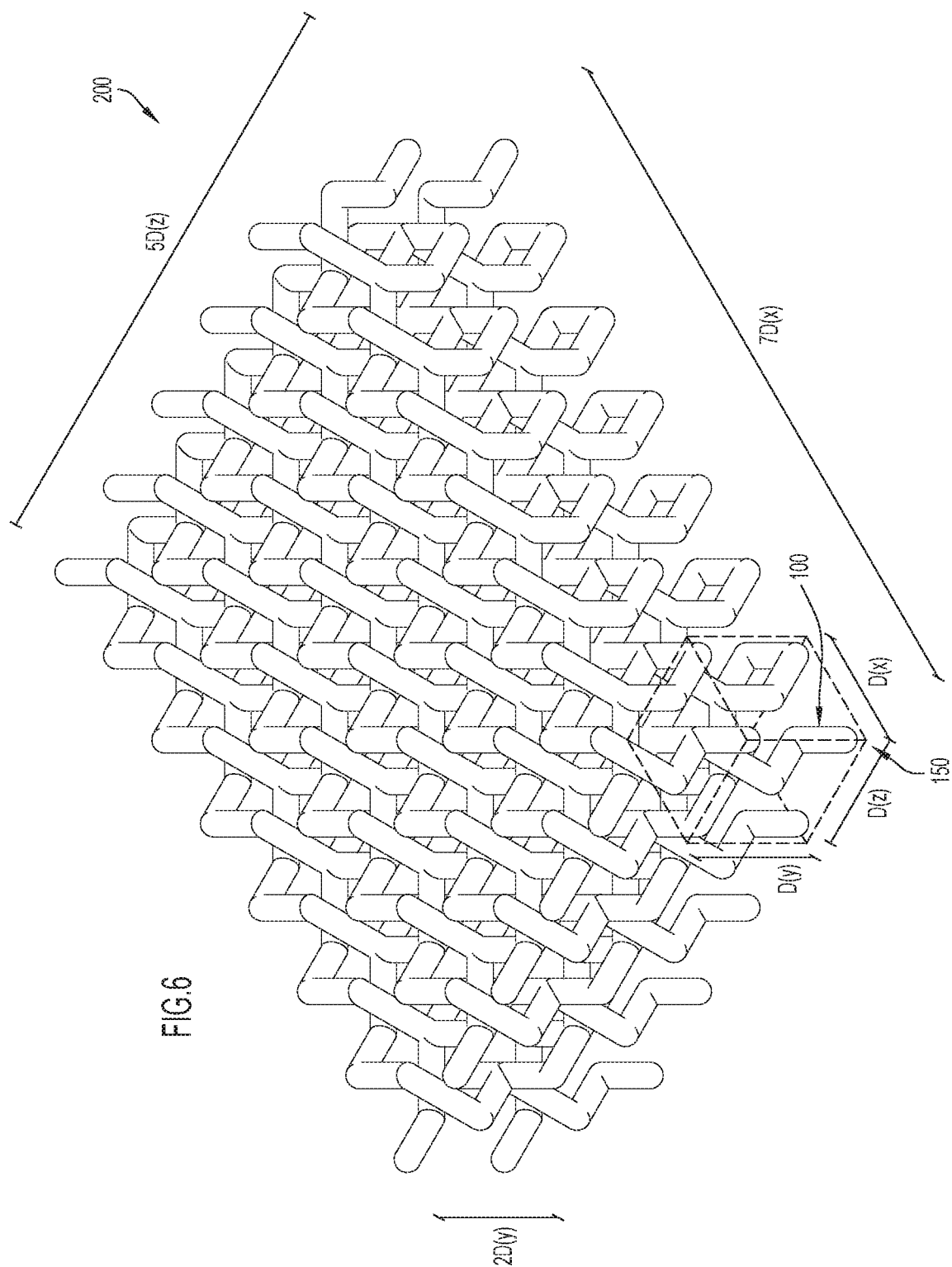
FIG. 6 is a top perspective view of a plurality of the cells of FIG. 1 formed into directional cushioning.

Now turning to FIGS. 1-5 for a description of a cell 100 that serves as the base unit for the directional cushioning presented herein (see FIG. 6 for an example of directional cushioning formed from a plurality of cells 100). FIGS. 1-5 generally show different views of the same cell 100; however, for clarity, only some reference numerals are carried through all of FIGS. 1-5. For example, the cell 100 is generally formed from two beams—beam 102 and beam 120—but, for clarity, the reference numerals for joints/bends that are included in beams of the cell 100 are only included in FIG. 1 while the reference numerals for segments that are included in beams of the cell 100 are only included in FIGS. 1 and 3-5. Similarly, in FIGS. 1-5, for reference and clarity of the description, the cell 100 is illustrated within a cube 150 (since cube 150 is merely a reference, it may be referred to as reference cube 150); however, relevant edges of the cube are only labeled in FIG. 1 and relevant corners of the cube 150 are only labeled in FIG. 2.

In the depicted embodiment, beams 102 and 120 are tubular cylindrical structures; however, in other embodiments, beams 102 and 120 can be hollow or solid extrusions of any shape, such as square or trapezoidal. That is, beams 102 and 102 may be tubes, tubular structures, elongate structures, elongate members, or other such beam-like structures of any shape and size. That being said, to provide the precision and unique lattice structure formed by beams 102 and beams 102, the beams are formed from 3D printing techniques that re now known or developed hereafter, as mentioned above.

The beams 102 and 120 each include a number of segments that collectively span the height, width, and depth of cube 150. That is, beams 102 and 120 collectively extend from a bottom face 154 to a top face 152 of the reference cube 150 (see the side and front views depicted in FIGS. 3 and 5, respectively), from a right side face 156 to a left side face 162 of the reference cube 150 (see the top and front views depicted in FIGS. 4 and 5, respectively), and from a front face 158 to a back face 160 of the reference cube 150 (see the side and top views depicted in FIGS. 3 and 4, respectively).

Figure 2:
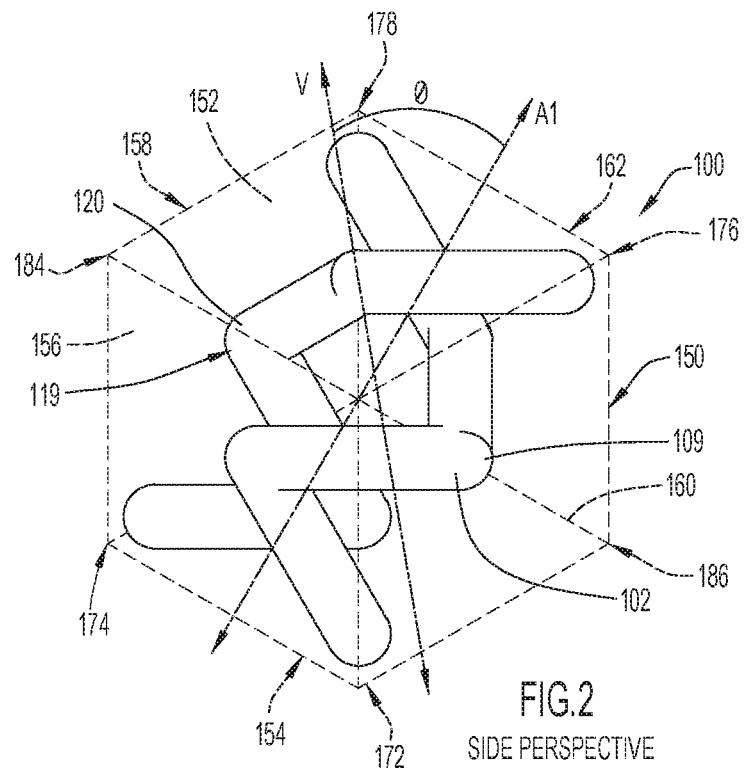
FIG. 2 is a side perspective view of the cell of FIG. 1, the rear perspective being 90 degrees offset (in the clockwise direction) from the front perspective of FIG. 1.

More specifically, beam 102 begins in corner 172 (i.e., the corner formed by back face 160, bottom face 154, and right side face 156, as shown in FIG. 2) and terminates at corner 178 (i.e., corner formed by front face 158, top face 152, and left side face 162 as shown in FIG. 2). Meanwhile, beam 120 starts in corner 174 (i.e., the corner formed by front face 158, bottom face 154, and right side face 156, as shown in FIG. 2) and terminates at corner 176 (i.e., corner formed by the back face 160, top face 152, and left side face 162, as shown in FIG. 2). That is, beam 102 and beam 120 each generally extend diagonally across cube 150. In order to cross or bypass each other, beam 102 and 120 rotate or wind around each other. That is, beam 102 and beam 120 are designed with rotational symmetry around an offset axis A1. This rotational symmetry creates a cushioned lattice or lattice-type structure with directional pre-dispositioning (i.e., biasing). Put another way, the rotational symmetry of the beams forms a shear assembly 119 and a restorative assembly 109 that provide cushioning that is biased to a rest position and configured to create shear during compression.

In the depicted embodiment, axis A1 extends between an edge 164 (formed between the top face 152 and the left side face 162, as shown in FIG. 1) and an edge 166 (formed between the bottom face 154 and the right side face 156, as shown in FIG. 1). In particular, axis A1 extends between a midpoint of edge 164 and a midpoint of edge 166. Consequently, axis A1 is offset from a vertical axis (V) by an angle θ of approximately 45 degrees. However, 45 degrees is simply an example offset and, in other embodiments, axis A1 may be offset from the vertical axis (V) by any desirable angle θ between approximately 30 degrees and approximately 60 degrees, between approximately 15 degrees and approximately 75 degrees, or even between approximately 5 degrees and approximately 85 degrees. By comparison, angles θ of approximately 0 degrees and approximately 90 degrees align axis A1 with the vertical axis (V) and a horizontal axis, respectively, and, thus, would not provide axis A1 at an offset.

Different angles θ may orient beams 102 and 120 at different angular orientations (since beams 102 and 120 are patterned around axis A1) which, in turn, would alter the amount of shear provided by cell 100 during compression. However, regardless of the offset angle θ, the axis A1 extends through a central plane that substantially bisects the cube 150. This is effectuated by rotating the axis A1 towards (or away) from the vertical axis (V) as the angle θ is increased or decreased. Consequently, the axis A1 may extend through edges 164 and 166 when angle θ is 45 degrees. If, instead, the angle θ is less than 45 degrees, axis A1 will intersect a point in the top face 152 included along an imaginary line in top face 152 extending between the midpoint of edge 164 and the vertical axis (V). Likewise, if the angle θ is less than 45 degrees, axis A1 will intersect a point in the bottom face 154 included along an imaginary line in bottom face 154 extending between the midpoint of edge 166 and the vertical axis (V).

Still referring to FIGS. 1-5, as mentioned, each of beams 102 and 120 is formed from a number of segments. In different embodiments, the beams may have different shapes (i.e., different numbers or arrangements of segments), have segments of different lengths, or otherwise differ from the depicted embodiment, provided that beam 102 and beam 120 are rotationally symmetrical about axis A1. That being said, the specific orientations of the segments comprising beams 102 and 120 are now described as one example of a lattice of beams that provides directional cushioning. Generally, the segments included in each of beams 102 and 120 may be formed as a unitary piece or beam (i.e., via 3D printing); however, for clarity the segments are described as being connected at joints or bends. In this particular embodiment, each of the joints or bends is approximately 45 degrees; however, the angle of these joints and bends may be dependent on the angle θ of the offset axis A1. For example, if the beams are patterned around an offset axis A1 with an angle θ of approximately 30 degrees, the bends or joints may span different angles to ensure that the beams are rotationally symmetrical about their offset axis A1.

Now turning to the specific segments in each beam, first, beam 102 includes four segments—segment 104, 108, 112, and 116—that are substantially straight and equally sized. Segment 104, which may be referred to as the first segment or bottom segment, extends, inwards from corner 172 (i.e., the corner formed by back face 160, bottom face 154, and right side face 156, as shown in FIG. 2), towards a center of right side face 156 (as is clearly shown in the side view of FIG. 3). That is, segment 104 extends, parallel to right side face 156, towards corner 184 (i.e., the corner formed by front face 158, top face 152, and right side face 156, as shown in FIG. 2). At approximately the center of right side face 156, segment 104 connects to segment 108 via bend 106.

Segment 108 is substantially planar, insofar as planar is used to describe a segment or bend that is substantially parallel to the bottom face 154 and/or the x-z plane (at least in its rest position), and extends from the center of right side face 156 towards the center of back face 160. That is, segment 108 extends between the right side face 156 and the back face 160, within a horizontal plane (e.g., an x-z plane), at an angle of approximately 45 degrees with respect to both right side face 156 and back face 160 (as is clearly shown in the top view of FIG. 4). At approximately the center of back face 160, segment 108 connects to segment 112 via bend 110. Segment 112 is also substantially planar and extends from the center of back face 160 towards the center of left side face 162. Thus, segment 112 extends within the same horizontal plane as segment 108 at an angle of approximately 45 degrees with respect to both back face 160 and left side face 162 (which is also clearly shown in the top view of FIG. 4). Consequently, together, segments 108 and 112 (and bend 110) essentially form a V in a horizontal plane (as is clearly shown in the top view of FIG. 4). This horizontal V may be referred to as a restorative assembly 109 at least because this V may act to restore the cell 100 to a rest position (i.e., drive restorative forces) after a compressive force is applied to the cell 100, as is explained in further detail below.

Continuing with the description of beam 102, segment 112 connects to segment 116, via bend 114, at approximately the center of left side face 162. Segment 116, which may be referred to as the fourth segment or top segment, extends, outwards towards corner 178 (i.e., the corner formed by front face 158, top face 152, and left side face 162 as shown in FIG. 2). That is, segment 116 extends, parallel to left side face 162, towards the corner 178 (as is clearly shown in the top and front view of FIGS. 4 and 5, respectively)

Now turning to beam 120 (with continued reference to FIGS. 1-5), beam 120 also includes four segments—segment 122, 126, 130, and 134—that are substantially straight and equally sized. In fact, in the depicted embodiment, segments 104, 108, 112, 116, 122, 126, 130, and 134 are segments of identical shape and size. Segment 122, which may be referred to as the first segment or bottom segment, extends, inwards from corner 174 (i.e., the corner formed by front face 158, bottom face 154, and right side 156, as shown in FIG. 2), towards a center of the bottom face 154. That is, segment 122 is substantially planar and extends, parallel to (or along) the bottom face 154, towards corner 186 (i.e., the corner formed by back face 160, bottom face 154, and left side face 162, as shown in FIG. 2). As is clearly shown in the side and front views of FIG. 3 and FIG. 5, respectively, segment 122 extends along or substantially parallel to the bottom face 154. At approximately the center of bottom face 154, segment 122 connects to segment 126 via bend 124.

Segment 126 extends from the center of bottom face 154 towards the center of front face 158 and, thus, extends at an angle of approximately 45 degrees with respect to both bottom face 154 and the front face 158 (as is clearly shown in the side view of FIG. 3). At approximately the center of front face 158, segment 126 connects to segment 130 via bend 128. Segment 130 substantially mirrors segment 126 and extends from the center of front face 158 to the center of top face 152 (as is clearly shown in the side view of FIG. 3). That is, segment 126 extends between the front face 158 and the top face 152 at an angle of approximately 45 degrees with respect to the front face 158 and the top face 152. Consequently, together, segments 126 and 130 (and bend 128) essentially form a V in a vertical plane. This vertical V may be referred to as a shear assembly 119 at least because this V creates or contribute to a shearing force as a compressive force is applied to the cell 100, as is explained in further detail below.

Continuing with the description of beam 120, segment 130 connects to segment 134, via bend 132, at approximately the center of top face 152 (as is shown clearly in the top view of FIG. 3). Segment 134, which may be referred to as the fourth segment or top segment, extends, outwards towards corner 176 (i.e., the corner formed by back face 160, top face 152, and left side face 162, as shown in FIG. 2). That is, segment 134 extends, parallel to (or along) top face 152, towards corner 176 (as is clearly shown in the top and front view of FIGS. 4 and 5, respectively).

Still referring to FIGS. 1-5, as mentioned above, the rotational symmetry of beams 102 and 120 (and their segments) creates a cushioned lattice or lattice-type structure with a directional pre-dispositioning. In other embodiments, the lattice structure created by beams 102 and beam 120 need not extend to the centers of cube faces and, instead, the various bends/joints may be formed at any point on the faces of the cube 150. For example, if the angle θ is changed from 45 degrees to 30 degrees, the various bends/joints may not be disposed at the centers of the faces of cube 150 and may be disposed closer to an edge of their corresponding face. Additionally or alternatively, all of the various bends/joints may not intersect a face of the cube 150 and, instead, at least some of the bends/joints may be formed at interior locations within the cube 150, provided that the lattice design provides a stable design with sufficient cushioning and sheared compression. For example, the lattice should maintain rotational symmetry about an axis extending through a central plane of cube 150 to ensure that the lattice is stable. If, on the other hand, a lattice is formed from beams only extending along/ within one half of cube 150 (and thus, the lattice is formed without rotational symmetry about an axis extending through a central plane of cube 150), the lattice may be unstable.

Moreover, in different embodiments, the lattice can be adjusted by changing the dimensions of one or more of the segments beams 102 and 102. For example, in some embodiments, the thickness and/or length (and, thus, angular orientation) of the segments included in the shear assembly 119 (i.e., segments 126 and 130) may be adjusted to adjust the amount of shear provided by cell 100 (with thicker shear assemblies resisting compressive forces and, thus, reducing the amount of shear provided by the shear assembly 119). In at least some of these embodiments, the thickness and/or length (and, thus, angular orientation) of the segments included in the restorative assembly 109 (i.e., segments 108 and 112) may be adjusted proportionally to the segments in the shear assembly 119.

Additionally, segment thickness need not always be constant or consistent across a layer of cushioning. Instead, a layer of cushioning can include different zones or areas with different thickness, for example, to provide zones of increased or decreased shear. By comparison, in most embodiments, any changes to the length of a segment are consistent across a layer of cushioning to ensure that the cells 100 forming the layer of cushioning properly connect across the cushioning. More specifically, at least the bottom and top segments of beams 102 and 120 (i.e., segments 104, 116, 122, and 134) should extend along one of the faces of the cube 150 to ensure that the beams 102 and 120 interconnect with other cells 100 when the cell 100 is extruded or patterned over a space to form a layer of cushioning, an example of which is described below in connection with FIG. 6. Preferably, the shear assembly 119 and restorative assembly 109 also extend to a face of the cube 150 (or include additional segments that extend to a face of cube 150) to provide the connections described below in connection with FIGS. 6-9. That being said, in different embodiments, the size of the cube 150 may be adjusted (i.e., increased or decreased) to provide cells 100 of different sizes for different layers of cushioning (in which case, at least the top and bottom segments remain aligned with faces of the reference cube 150, albeit a smaller or larger reference cube 150).

Now turning to FIG. 6 for a description of a layer of directional cushioning 200 formed from a plurality of the cells 100 from FIG. 1. As mentioned, the cell 100 can be patterned over a space, including an irregular space (such as an insole of an upper), to create a layer of directional cushioning. In the depicted embodiment, the cube 150 in which cell 100 is formed has a dimension "D," consequently, the width is labeled as "D(X)," the height is labeled as "D(Y)," and the depth is labeled as "D(Z)," with the parenthetical references referring to the associated x-, y-, or z-axis. In the depicted embodiment, the cell 100 is patterned to create the directional cushioning 200 by patterning the cell 100 seven times in the width direction (i.e., along the x-axis), twice in the height direction (i.e., along the y-axis), and five times in the depth direction (i.e., along the z-axis).

To illustrate this patterning, the directional cushioning 200 is labeled with the dimensions of 7D(X)×2D(Y)×5D(Z) (i.e., width×height×depth). However, the patterning may not pattern the cell 100 by aligning faces of adjacent reference cubes 150. Instead, joints from adjacent cells 150 may be connected or coupled together (or more accurately, adjacent cells 100 may be formed (i.e., 3D printed) together with shared joints), as is explained in further detail below in connection with FIGS. 7-9, and, thus, the overall dimensions of the directional cushioning 200 may be smaller than a multiple of one cell's dimensions. Moreover, although the directional cushioning 200 illustrated in FIG. 6 is substantially rectangular, a cell 100 need not be patterned into a rectangular layer of directional cushioning 200. Instead, a cell 100 can be patterned irregularly (i.e., heights of 2, 3, 4, 5 along the x-axis), partially patterned, or otherwise shaped to create any desirable shape and/or fill an irregular space. Consequently, the directional cushioning presented herein can be shaped to form a portion of a sole structure (i.e., an outsole) for any desirable article of footwear.

Figure 7:
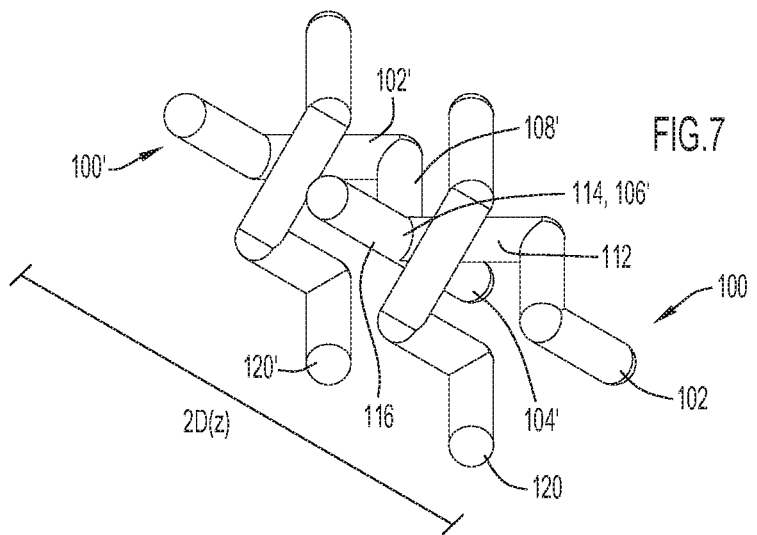
FIG. 7-9 are a front perspective views of two of the cells of FIG. 1 connected in three different manners.
Figure 8:
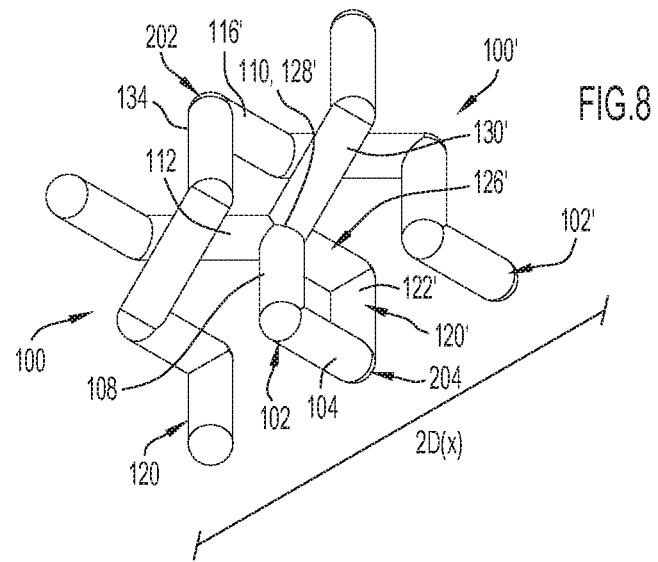
Figure 9:
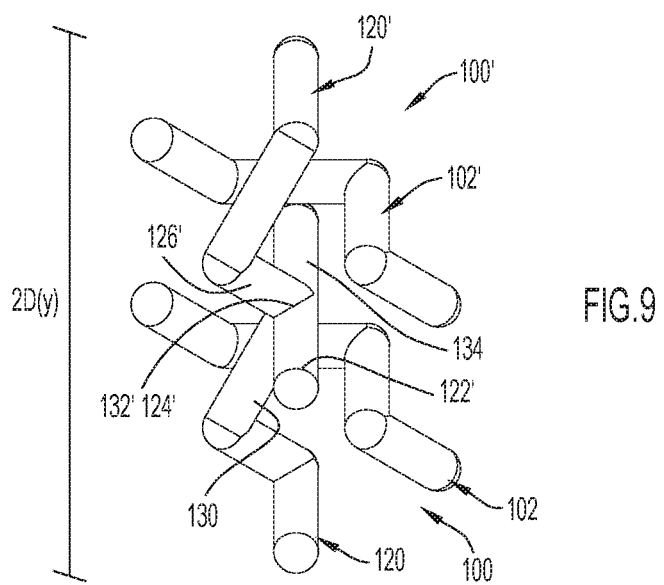

Still referring to FIG. 6, but now with reference to FIGS. 7-9 as well, since the cell 100 is rotationally symmetrical and includes bends/joints at the edges of a reference cube 150, each cell 100 interconnects with any adjacent cells. That is, adjacent cells 100 in the plurality of cells forming directional cushioning 200 connect so that the plurality of cells 100 form a unitary structure. In different embodiments, the interconnection may amplify or dampen the shear and restorative forces generated by the shear assemblies 119 and restorative assemblies 109 included in the directional cushioning 200; however, generally, the interconnection creates a durable layer of cushioning that creates a lateral shear during compression and a restorative force as the compression is released.

FIGS. 7-9 each illustrate example interconnections between two adjacent cells—a first cell 100 and a second, duplicate cell 100' from a front perspective view (the same perspective as FIG. 1). In FIG. 7, the cells 100 and 100' are connected (or patterned) along the z-axis, in FIG. 8, the cells 100 and 100' are connected (or patterned) along the x-axis, and in FIG. 9, the cells 100 and 100' are connected (or patterned) along the y-axis. For clarity, only the portions of cells 100 and 100' forming a connection between cell 100 and cell 100' are labeled in FIGS. 7-9; however, it is to be understood that cells 100 and 100' are identical to the cell 100 depicted in FIGS. 1-6 (and, thus, include the same parts). Moreover, although the word "connect," "connection," "interconnect," etc. are used herein to describe the interplay between adjacent cells, in actuality, any cells 100 included in directional cushioning 200 may all be formed together via additive manufacturing and, thus, the beams may not be connected as much as formed together. In other words, the directional cushioning 200 may be a unitary structure without any joints, seams, couplings, etc., despite being described as such. That being said, each of the connections depicted in FIGS. 7-10 are addressed in turn below.

First, in FIG. 7, a first cell 100 is connected with a duplicate cell 100' that is adjacent to cell 100 along the z-axis (and, thus, the depth is labeled with "2D(Z)," despite the overall depth of the two cells not being double the depth of one of the cells 100, 100', as is explained in detail above). When cell 100 is patterned along the z-axis, beam 102 connects to a replica of itself (beam 102'). More specifically, the joint 114 of the 100 meshes or combines with joint 106' of the duplicate cell 100' so that segments 112 and 116 of cell 100 are connected to segments 104' and 108' of the duplicate cell 100' (however, as mentioned, when cells 100 and 100' are 3D printed, only one bend/joint is created). Meshing joint 106' with joint 114 substantially aligns segment 116 with segment 104' and simultaneously aligns the restorative assemblies 109 (i.e., the horizontal V's formed by segments 108 and 112 and segments 108' and 112') of cell 100 and cell 100'. Thus, patterning cell 100 along the z-axis essentially creates a waveform-like structure of the restorative assemblies 109, with linear beams extending between each assembly at an angle of approximately 45 degrees from a vertical axis extending through the meshed joints 114, 106'. In some embodiments, the linear beams may reinforce or amplify the restorative force provided by the restorative assemblies 109 included in a layer of cushioning formed from cells 100 (i.e., layer 200). Moreover, since the linear beams extend at angle, the linear beams allow the restorative assemblies 109 to move laterally when the directional cushioning shears, as is described in further detail below.

Second, in FIG. 8, a first cell 100 is connected with a duplicate cell 100' along the x-axis (and, thus, the depth is labeled with "2D(X)," despite, the overall width of the two cells not being double the width of one of the cells 100, 100', as is explained in detail above). When cell 100 is patterned along the x-axis, the restorative assembly 109 of cell 100 is connected to the shear assembly 119 of cell 100'. Additionally, an end of beam 120 connects to an end of beam 102' while an end of beam 102 connect to ends of beam 120' to form new joints 202 and 204, respectively (insofar as "new" denotes that the joints do not exist prior to patterning cell 100 in the x-direction). Each of these connections is addressed in turn.

Initially, the restorative assembly 109 of cell 100 is connected to the shear assembly 119 of cell 100' by meshing or combining joint 110 of cell 100 (i.e., the apex of the horizontal V forming the restorative assembly 109 of cell 100) with the joint 128' of cell 100' (i.e., the apex of the vertical V forming the shear assembly 119 of cell 100'). As is explained below in connection with FIGS. 10-13, due, at least in part, to this connection, the shear assembly 119 and restorative assembly 109 of adjacent cells may move together, so that as the shear assembly 119 creates lateral movement in the directional cushioning, the restorative assembly 109 generates potential energy that can be released (upon the release of a compressive force) to create a restorative force. That is, this connection essentially combines a restorative assembly 109 of one cell with the shear assembly 119 of an adjacent cell to create a spring-like, cam-like, and/or lever-like structure. Patterning this connection along the z-axis (as shown in FIG. 7) only increases the number of levered springs and cams, further increasing the regenerative ability of the directional cushioning.

The two assemblies are further interconnected and supported by new joints 202 and 204, which are also formed when the cell 100 is patterned along the x-axis. Joint 202 is formed between segment 134 (i.e., the top segment of beam 120) and segment 116' (i.e., the top segment of beam 102'). Joints 202 and 204 further support the shear assembly 119 and restorative assembly 109 by stabilizing the two assemblies while still allowing the assemblies to move laterally (i.e., to create shear) between a compressed position and a rest position. For example, joint 202 connects the planar top segment 134 of beam 120 to a skewed segment 116' of beam 102', thus ensuring that segment 134 can move laterally as the shear assembly 119 of beam 120 (i.e., segments 126 and 130) is compressed and moves laterally. Meanwhile, joint 204 forms a rectangular support beneath the restorative assembly 109. This support may encourage the restorative assembly 109 to remain biased towards its rest position during compression so that the restorative assembly 109 can drive or bias the directional cushioning back to its rest position when compressive forces acting on the directional cushioning are released. This may create return energy that essentially springs a wearer forward or laterally (depending on the orientation of the directional cushioning).

Third, and finally, in FIG. 9, a first cell 100 is connected with a duplicate cell 100' along the y-axis (and, thus, the height is labeled with "2D(Y)," despite, the overall height of the two cells not being double the height of one of the cells 100, 100', as is explained in detail above). When cell 100 is patterned along the y-axis, beam 120 connects to a replica of itself (beam 120'). More specifically, the joint 132 of the cell 100 meshes or combines with joint 124' of the duplicate cell 100' so that segments 130 and 134 of cell 100 are connected to segments 122' and 126' of the duplicate cell 100' (however, as mentioned, when cells 100 and 100' are 3D printed, only one bend/joint is created). Meshing joint 124' with joint 132 substantially aligns segment 134 with segment 122' and simultaneously aligns the shear assemblies 119 of cell 100 and cell 100'. Thus, patterning cell 100 along the y-axis essentially creates a waveform-like structure of shear assemblies 119 with horizontal beams extending between each assembly 119. In some embodiments, the horizontal beams may reinforce or amplify the shear force provided by the shear assemblies included in a layer of cushioning formed from cells 100 (i.e., layer 200).

Referring back to FIG. 6, but with continued reference to FIGS. 7-10, the different dimensions of directional cushioning 200 may provide different characteristics. Generally, patterning the cell 100 in the x-axis and z-axis creates a strong and durable cushion with enough resistance or bias (i.e., provided by the restorative assemblies 109) to maintain the directional cushioning in a rest or unbiased position until a sufficient amount of downward force is applied to the directional cushioning 200. This provides cushioning that is similar to conventional cushioning structures (i.e., foam) included in sole structures). As is explained above in connection with FIGS. 7 and 8, the interconnection between cells that are adjacent with each other in the x-direction or z-direction provides this durability and resistance/restorative force. Expanding the directional cushioning in either the x-direction or the z-direction may increase the amount of downwards force required to compress the directional cushioning 200 (i.e., increase a compressive threshold). By comparison, expanding the directional cushioning in the y-direction may decrease the amount of downwards force required to compress the directional cushioning 200 (i.e., decrease the threshold) since patterning a cell in the y-direction may amplify the impact of the shear assemblies 119 included in the cells 100, as is explained above in connection with FIG. 9.

Figure 10:
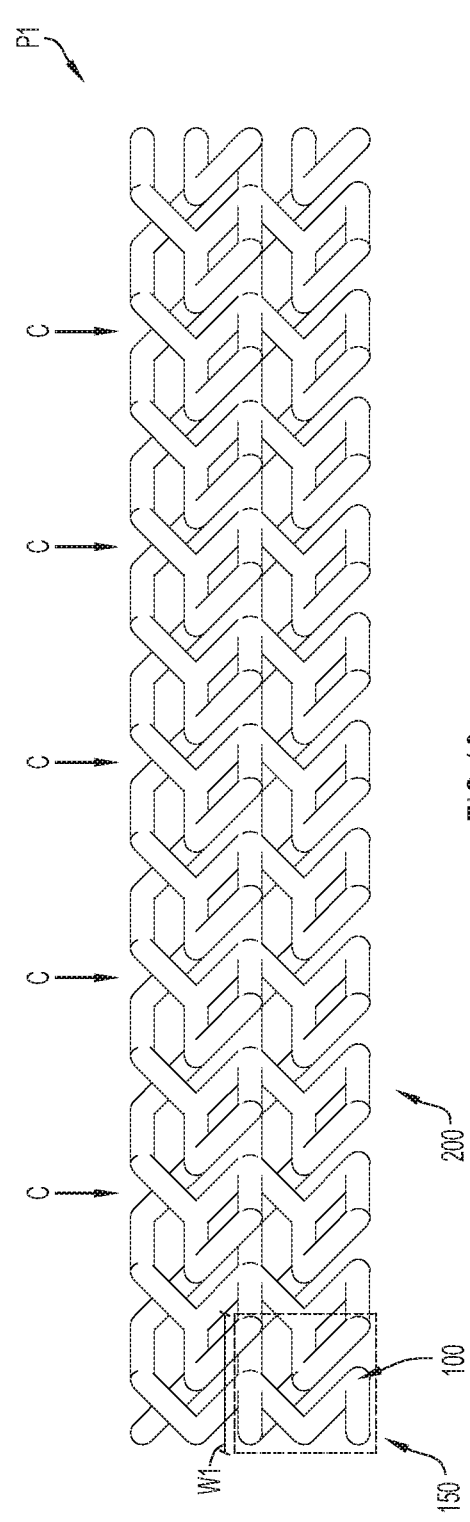
FIG. 10 is a side view of the directional cushioning of FIG. 6 while in a rest position.
Figure 11:
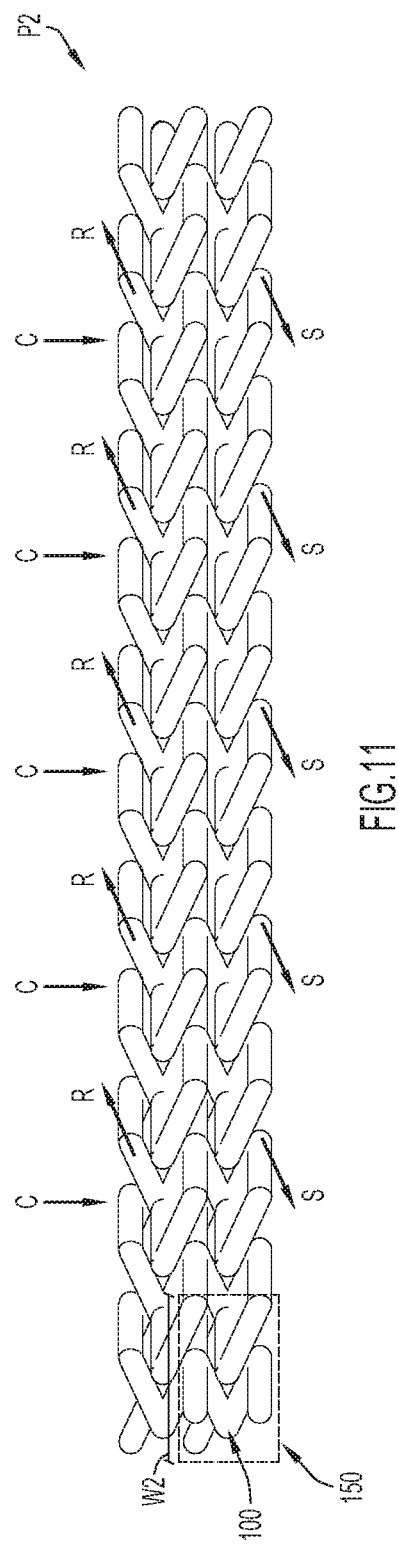
FIG. 11 is a side view of the directional cushioning of FIG. 6 while a compressive force is exerted downwards on the directional cushioning.
Figure 12:
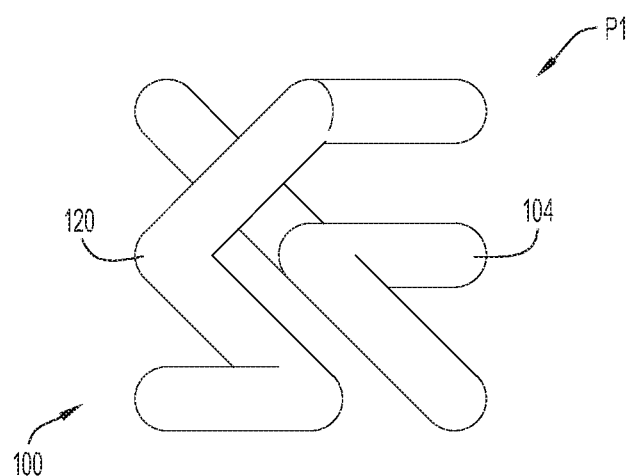
FIG. 12 is a side view of the cell of FIG. 1 while in a rest position.
Figure 13:
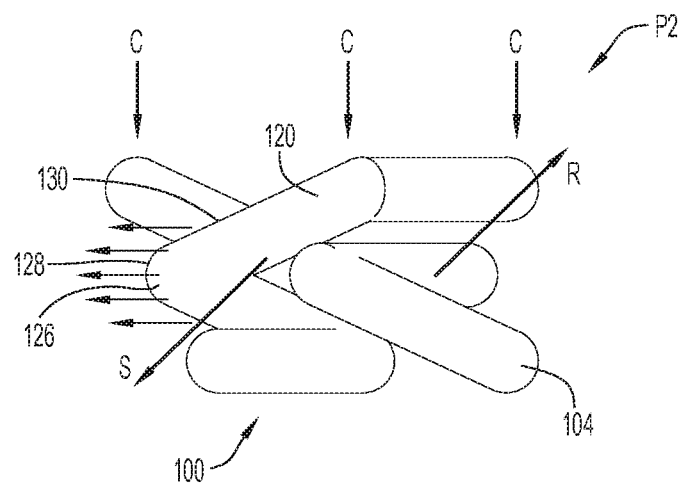
FIG. 13 is a side view of the cell of FIG. 1 while a compressive force is exerted downwards on the directional cushioning.

In FIGS. 10-13, the directional cushioning 200 (or a cell 100 that forms a portion of cushioning 200) is shown when a downward, compressive force is applied thereto (i.e., from a wearer pressing a shoe downwards into the ground). More specifically, in FIG. 10, the directional cushioning 200 is shown in a rest position P1, while in FIG. 11, the directional cushioning 200 is shown in a compressed position P2. Likewise, in FIG. 12, cell 100 is shown in a rest position P1, while in FIG. 13, the cell 100 is shown in a compressed position P2. In FIGS. 10 and 11, a cell 100 is also shown within reference cube 150. Although a cell 100 reacts differently to a compressive force when the cell is interconnected to other cells (as opposed to alone), the cells 100 shown in FIGS. 10-13 are illustrated with the same reaction for the purposes of this description. That being said, in FIGS. 10 and 12, a compressive force ("C") is shown acting upon the directional cushioning 200 and the cell 100, respectively, while the cushioning 200 and the cell 100 are each in the rest position P1. In these illustrations, the compressive force "C" is shown as a downward force; however, the compressive force need not be entirely downward and may be any force that causes the directional cushioning to compress against a surface, for example, as the wearer of a shoe including an outsole with directional cushioning runs across a surface.

As a compressive force is applied to the directional cushioning 200 (or the cell 100), the shear assembly 119 included in the directional cushioning begins to move laterally, driving the directional cushioning through a lateral compressive motion (i.e., creating shear). More specifically, and as can be seen best in FIG. 13, segments 130 and 128 (i.e., the shear assembly 119 included in beam 120) compress together while moving the apex of the shear assembly 119 (i.e., joint/bend 128) laterally away from the restorative assembly 109. That is, the shear assembly 119 moves in a shearing motion (illustrated with "S" arrows). Since, as is discussed with respect to FIGS. 6-9, the restorative assembly 109 is coupled to the shear assembly 119 via skewed segments, the restorative assembly 109 can translate horizontally and vertically, while remaining substantially horizontal, building potential energy (i.e., like a torsion spring), as the shear assembly 119 guides or drives the directional cushioning 200 through shearing motion "S." The shearing motion "S" may incrementally lengthen the cells 100 included in the directional cushioning 200 so that when the directional cushioning 200 is compressed (i.e., in a compressed position P2) each cell 100 has a width W2 that is longer than its original width W1 (where the width shown in FIGS. 10 and 11 corresponds to the width or x-direction from FIGS. 6-9).

As the compressive force "C" is released or relaxed (i.e., relaxed below a compression threshold), the restorative assemblies 109 begin to release their potential energy and drive the directional cushioning 200 (or a cell 100) back towards its rest position. That is, the directional cushioning 200 creates a restorative force (illustrated with "R" arrows) that may spring or propel a wearer in a direction opposite to the compressive direction. Depending on the material of the lattice (i.e., the material of beams 102 and 120), the offset angle of the rotational symmetry axis A1 (see FIGS. 1 and 2), the thickness of the latticed beams, and perhaps a number of other factors, the return energy may be up to approximately 45% of the compressive energy, 50% of the compressive energy, or various other percentages. The magnitude of the return energy may also depend on the lifecycle stage of the directional cushioning (i.e., new, light use, heavy use, etc.).

Figure 14:
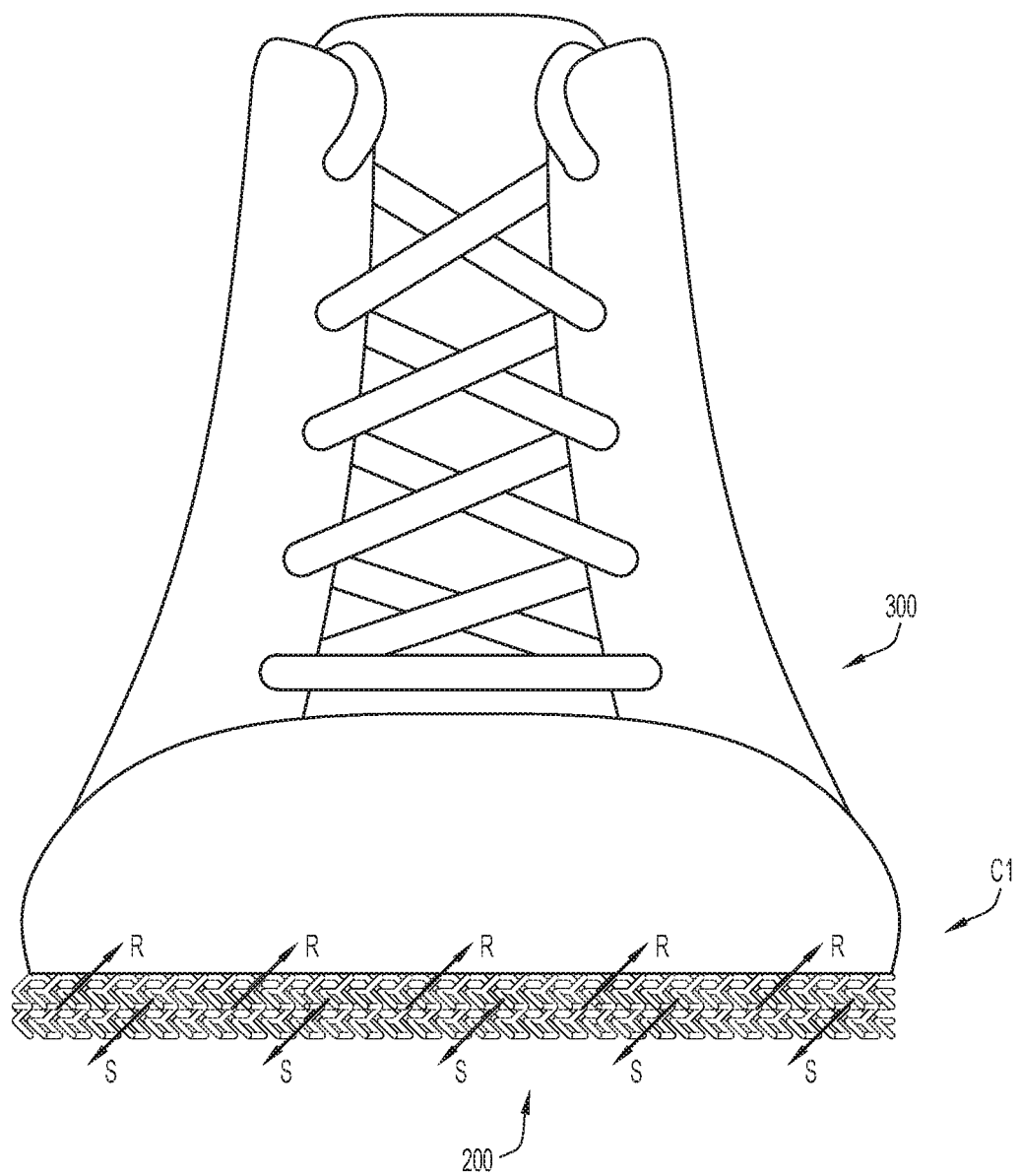
FIG. 14 is a front view of a basketball shoe including a layer of the directional cushioning of FIG. 6 as a sole structure.

FIGS. 14 and 15 illustrate two example use cases for the directional cushioning presented herein. In FIG. 14, the directional cushioning 200 is forming a sole structure (i.e., a midsole) for a basketball shoe 300 (for a right foot) and in FIG. 15, the directional cushioning is forming a sole structure (i.e., a midsole) for a running shoe 400 (for a right foot). Due to the differing intended purposes of these two shoes, the directional cushioning is provided in different orientations or configurations in these two shoes. In particular, in FIG. 14 the directional cushioning 200 is configured in a cutting configuration C1, and in FIG. 15 the directional cushioning is configured in a running configuration C2.

Generally, the cutting configuration C1 includes directional cushioning 200 that is rotated 90 degrees (about a vertical axis) with respect to the directional cushioning 200 included in the running configuration C2. That is, the x-direction of the directional cushioning 200 (see FIG. 6) runs along the length of basketball shoe 300 and the x-direction of the directional cushioning 200 runs along the width of the running shoe 400. The directional cushioning is then patterned as necessary to provide an appropriate shape for the midsole of the basketball shoe 300 and the running shoe 400. Reorienting the directional cushioning creates different forces or actions in the basketball shoe 300 and the running shoe 400.

More specifically, In the cutting configuration C1 depicted in FIG. 14, the directional cushioning 200 is oriented to create a restorative force ("R") directed towards a medial side of the shoe 300. Typically, when a basketball player cuts, the player presses off of his or her outside foot and moves in the opposite direction. The cutting configuration C1 is configured to support and enhance this cutting movement. More specifically, as the player applies pressure towards the lateral side of the sole of the shoe 300, the directional cushioning 200 will shear in the shearing direction S, towards (or laterally outside of) the lateral side of the shoe 300. As this compression is relaxed (i.e., as the player moves into the cut), the directional cushioning 200 will generate a restorative force in direction R, essentially pushing or springing the player into his or her cut.

By comparison, in the running configuration C2 depicted in FIG. 15, the directional cushioning is oriented to create a restorative force directed towards a front or forward portion of the shoe 400. More specifically, the running configuration C2 is configured to support and enhance forward running movement. As a runner applies pressure downwards into the sole of the shoe 400, the directional cushioning 200 will compress and shear in the shearing direction S, towards the back or rear region of the shoe 400. As this compression is relaxed (i.e., as the runner propels themselves off of the foot contacting the ground), the directional cushioning will generate a restorative force in direction R, essentially pushing or springing the runner forward into their stride.

Now referring generally to FIGS. 14 and 15, according to the present invention, an article of footwear may include an upper coupled to (e.g., mounted on) a sole structure. The article of footwear may define several regions corresponding with various parts of a foot, such as a rear footwear region generally corresponding with the rear of the foot (e.g., the hindfoot including the heel); an intermediate footwear region disposed forward the rear region and generally corresponding to the midfoot (e.g., the arched, instep, and ball areas of the foot); and a forward footwear region disposed forward of intermediate region and generally corresponding to the forefoot (e.g., the toes of the foot). The article of footwear may also include a lateral side and a medial side. The directional cushioning may be included in the sole structure and span any region of the foot (i.e., the rear footwear region, the intermediate footwear region, and the forward footwear region) in any area between or adjacent to the lateral side and the medial side.

In some embodiments, the directional cushioning may be included between an inner layer and outer layer of material. That is, the directional cushioning may comprise a midsole. Alternatively, the entire sole structure may be comprised of directional cushioning. In any case, the sole structure can be coupled to any desirable upper, regardless of how the upper is formed. The article of footwear may further include a fastener (e.g., a shoe lace) and the fastener may be secured to the upper, the sole structure, or a combination thereof.

Generally, a sole structure comprising directional cushioning is a durable, wear-resistant component configured to provide cushioning as the article footwear impacts the ground. As mentioned, in an embodiment, the sole structure may include an insole, a midsole, and an outsole. In other embodiments, the sole may be a unitary and/or one-piece structure. The sole structure and/or the directional cushioning may be formed of a single material or may be formed of a plurality of materials. By way of example, the directional cushioning may be 3D printed from a first material and may be affixed to an insole made of a second material. The first material may be any material that can be 3D printed and provide the characteristics described herein. Additionally or alternatively, the directional cushioning may be affixed to an outsole made of a third material. The outsole material may possess different relative wear ration and/or shoe hardness values if desired.

While the invention has been described in detail and with reference to specific embodiments thereof, it will be apparent to one skilled in the art that various changes and modifications can be made therein without departing from the spirit and scope thereof. For example, beams 102 and 120 are merely example beams that can form a lattice structure for directional cushioning and are not intended to be limiting. As has been mentioned herein, the angular orientation of these beams, the segment shape and size, the angles of the bends/joints included in beams 102 and 102, and any other characteristics may differ from the depicted embodiment. Moreover, shoes 300 and 400 are merely examples and the directional cushioning presented herein may be included on any shoe type. For example, the directional cushioning layer 200 may be included on a shoe stylized as a boot or high top athletic shoe that rises above the ankle of the wearer.

It is therefore intended that the present invention covers the modifications and variations of this invention provided they come within the scope of the appended claims and their equivalents. It is to be understood that terms such as "top," "bottom," "front," "rear," "side," "height," "length," "width," "upper," "lower," "interior," "exterior," "medial," "lateral," and the like as may be used herein, merely describe points of reference and do not limit the present invention to any particular orientation or configuration. Moreover, while the invention has been described in detail and with reference to specific embodiments thereof, it will be apparent to one skilled in the art that various changes and modifications can be made therein without departing from the spirit and scope thereof.

We claim:

1. An article of footwear comprising:
   an upper
   a sole structure secured to the upper and including cushioning formed from a plurality of cells, wherein each cell in the plurality of cells includes a lattice of elongate structures that extend symmetrically around an offset axis, each offset axis being offset with respect to a vertical axis of its cell, and the elongate structures include:
   a first elongate structure that defines a shear assembly configured to create a lateral shear as the lattice of elongate structures of each cell are compressed by a compressive force; and
   a second elongate structure that defines a restorative assembly configured to return the lattice of elongate structures to a rest position as the compressive force is released, the restorative assembly driving creation of a restorative force on the upper of an article of footwear in response to the lateral shear.

2. The article of footwear of claim 1, wherein the elongate structures of adjacent cells in the plurality of cells connect so that the plurality of cells form a unitary structure.

3. The article of footwear of claim 2, wherein the unitary structure is formed via additive manufacturing.

4. The article of footwear of claim 1, wherein the restorative force is exerted towards a medial side of the article of footwear.

5. The article of footwear of claim 1, wherein the restorative force is exerted towards a forward footwear region of the article of footwear.

6. The article of footwear of claim 1, wherein the elongate structures are segmented beams that each extend diagonally across a reference cube while winding around each other to provide rotational symmetry around the offset axis.

7. The article of footwear of claim 6, wherein the offset axis extends through a vertical plane that substantially bisects opposing faces of the reference cube.

8. The article of footwear of claim 7, wherein the vertical axis is a central vertical axis of the reference cube and the offset axis is disposed at an angle in a range of approximately 30 degrees to approximately 60 degrees from the central vertical axis of the reference cube.

9. The article of footwear of claim 6, wherein the segmented beams each include four segments that are substantially straight and equally sized.

10. The article of footwear of claim 1, wherein cells of the plurality of cells disposed in a first region of the article of footwear have elongate structures with a first thickness and cells of the plurality of cells disposed in a second region of the article of footwear have elongate structures with a second thickness, thicker than the first thickness, so that the second region provides a reduced amount of the lateral shear as compared to the first region.

11. The article of footwear of claim 1, wherein the restorative assembly generates return energy to create the restorative force, the return energy being up to approximately 50% of compressive energy transferred to the cushioning by the compressive force.

12. The article of footwear of claim 1, wherein the shear assembly comprises a horizontal V formed by the first elongate structure and the restorative assembly comprises a vertical V formed by the second elongate structure.

13. The article of footwear of claim 12, wherein, in response to the compressive force, the vertical V of the restorative assembly compresses and an apex of the horizontal V of the shear assembly moves away from its respective restorative assembly to incrementally lengthen each cell of the plurality of cells.

14. The article of footwear of claim 1, wherein the elongate structures of adjacent cells in the plurality of cells connect to form a uniform pattern across the cushioning.

* * * * *